United States Patent
Parann-Nissany

(10) Patent No.: US 9,660,801 B2
(45) Date of Patent: May 23, 2017

(54) METHODS AND DEVICES FOR KEY MANAGEMENT IN AN AS-A-SERVICE CONTEXT

(71) Applicant: Porticor Ltd., Hod Hasharon (IL)

(72) Inventor: Gilad Parann-Nissany, Ramat Hasharon (IL)

(73) Assignee: Porticor Ltd., Hod Hasharon (*) Notice: Subject to any disclaimer, the term of this patent is extended or adjusted under 35 U.S.C. 154(b) by 7 days.

(21) Appl. No.: 14/746,853

(22) Filed: Jun. 23, 2015

(65) Prior Publication Data

US 2015/0372812 A1 Dec. 24, 2015

Related U.S. Application Data

(60) Provisional application No. 62/015,547, filed on Jun. 23, 2014.

(51) Int. Cl.
| | | |
|---|---|---|
| *H04L 9/08* | (2006.01) | |
| *H04L 9/00* | (2006.01) | |
| *H04L 29/06* | (2006.01) | |
| *H04L 29/08* | (2006.01) | |

(52) U.S. Cl.
CPC ............ *H04L 9/008* (2013.01); *H04L 9/0825* (2013.01); *H04L 63/06* (2013.01); *H04L 67/34* (2013.01); *H04L 2209/04* (2013.01)

(58) Field of Classification Search
CPC ...................................................... H04L 9/008
USPC ...................................................... 380/287
See application file for complete search history.

(56) References Cited

U.S. PATENT DOCUMENTS

| 5,901,284 A * | 5/1999 | Hamdy-Swink ........ H04L 29/06 340/5.74 |
|---|---|---|
| 2011/0072489 A1 | 3/2011 | Parann-Nissany |
| 2011/0311055 A1 | 12/2011 | Parann-Nissany |
| 2015/0143111 A1 | 5/2015 | Parann-Nissany |

OTHER PUBLICATIONS

U.S. Appl. No. 14/711,369, filed May 13, 2015, Porticor Ltd.

* cited by examiner

*Primary Examiner* — Jacob Lipman
(74) *Attorney, Agent, or Firm* — Reuven K. Mouallem; FlashPoint IP Ltd.

(57) ABSTRACT

The present invention discloses methods and devices for key management in an as-a-service (aaS) context. Methods include the steps of: upon receiving a creation request in a provider computing-environment, creating a specific key in at least one location in the provider computing-environment by repetitively computing respective specific-key contributions: in a set of N computing resources in the provider computing-environment; and in a set of M customer locations in a customer computing-environment; and applying the respective specific-key contributions to change a specific-key value in the computing resources, wherein the respective specific-key contributions are never revealed to any computing resources, and to any customer locations, other than respective contributors; wherein at least one location is a region of memory located in a computing resource operationally connected to the provider computing-environment, wherein the customer locations are regions of memory located in a computing resource operationally connected to the customer computing-environment.

9 Claims, 10 Drawing Sheets

Exemplary Embodiment

METHODS AND DEVICES FOR KEY MANAGEMENT IN AN AS-A-SERVICE CONTEXT

CROSS REFERENCE TO RELATED APPLICATIONS

This patent application claims priority under 35 U.S.C. §119(e) to U.S. Provisional Patent Application No. 62/015,547, filed Jun. 23, 2014, which is hereby incorporated by reference in its entirety.

FIELD AND BACKGROUND OF THE INVENTION

The present invention relates to methods and devices for key management in an as-a-service (aaS) context (e.g., SaaS (software as a service), PaaS (platform as a service), and IaaS (infrastructure as a service)).

Key-management processes involving splitting keys are well-established. All data-encryption keys are split using a master key. The master key is: (1) a real key, not a password; (2) known (i.e., revealed) only to the customer; and (3) very easy to manage. Keys are encrypted and integrity-protected using standard algorithms. Keys are associated with (encrypted and integrity-protected) metadata. Customer-side key hierarchies provide deployment flexibility.

Assume that a key may be legitimately used by several entities in an environment (each is called an "appliance"); some of the appliances may create the key, while other appliances may use the key. Each such creation operation or usage operation may in principal be performed by the same or a different entity.

Also, the appliances are in communication with a Protected Virtual Key Manager (PVKM) which may provide services to the abovementioned appliances and to the users of the system. Such services are related to managing the keys of the system, and also related to enhancing the security of the system.

In the discussion below, the PVKM may be viewed as a "location" (whether physical or virtual) in such an environment, while each appliance and other security element may be viewed as another "location" (whether physical or virtual). However, for the avoidance of doubt, while the PVKM itself may be implemented as a collection or a cluster, it is still referred to as a location for the sake of simplicity.

Referring to the drawings, the overall processes have been depicted according to separate, sequential time lines (going from top to bottom in the drawings) for two primary generalized components, an appliance A and a PVKM B, in order to representationally isolate the parallel processes that are occurring on each component independently.

FIG. 1 is a simplified high-level block diagram of the scheme of major operational steps in an exemplary implementation for splitting keys in a key-management system, according to the prior art. To split key-pairs (Sub-Process I), an appliance A and a PVKM B are shown in which PVKM B generates an appropriate key-pair (Block Step 2), and transmits a half-key to appliance A (Arrow Step 4). Appliance A then uses the half-key with a master key (Block Step 6) to create a data encryption key (Block Step 8).

It is noted that appliance A is intended to be a simplified example of a plurality of appliances in order to provide clarity throughout the description. It is understood that the present invention has broader applicability to a collection or cluster of such appliances. Furthermore, PVKM B is intended to be one conceptual entity (e.g., a server); however, in practical implementations, PVKM B may be a plurality of entities (e.g., a cluster of servers for fail-over protection). In generalizations of this approach, there may be more locations, and therefore more timelines.

The master key is critical to the security of the whole system. Initially, it is kept only in memory. A passive attacker that takes a "snapshot" of the storage device cannot see the master key. The master key is then encrypted so that even an active attack is mitigated. Such encryption is access-controlled, policed on the key-management service, and integrated with customer access-control.

In order to encrypt the key, and yet still use the key, Homomorphic Key Management (HKM) has been shown to be an effective protocol. Homomorphic functions have $F(a \ominus b) = F(a) \ominus F(b)$ in which $\ominus$ is a suitable operator. Partially-homomorphic functions are employed for key management only (e.g., ElGamal encryption).

ElGamal encryption is homomorphic and entails a secret key x and a public key $(g, h=g^x)$ in which g is a generator. Encryption is random and produces a pair: $Enc(m)=(c, d)=(g^r, h^r \cdot m)$ in which r is random, and $Dec(c, d)=d/c^x=m$. Such keys can be used to exploit the homomorphic property. As an example, under a multiplication operation: $Enc_{pk}(m; r) \boxtimes Enc_{pk}(m'; r') = Enc_{pk}(m \cdot m'; r+r')$ for element-wise multiplication. Such HKM methods employing split-key encryption are amenable to exact proofs of strength.

FIG. 2 is a simplified high-level block diagram of the scheme of major operational steps in an exemplary implementation for creating an appliance using homomorphic key-management, according to the prior art. To create a new appliance using HKM (Sub-Process II), PVKM B picks an ElGamal key (Block Step 10), stores a secret half-key, $SK_i$ (Block Step 12), and transmits a public half-key, $PK_i$, to appliance A (Arrow Step 14), which stores $PK_i$ (Block Step 16). Appliance A uses $PK_i$ to encrypt a user-supplied master-key K as $E_{PK_i}(K)$ (Block Step 18). Appliance A then generates and stores a random mask, $mask_i$ (Block Step 20). Appliance A performs a homomorphic operation by calculating $E_{PK_i}(K \ominus mask_i)$ (Block Step 22), and transmits the result to PVKM B (Arrow Step 24), which then decrypts and stores the masked master-key, $(K \ominus mask_i)$ (Block Step 26). It is denoted that $\ominus$ is a suitable operator for encryption; the inverse of $\ominus$ is denoted as "/" (sometimes represented by the symbol "÷") for decryption.

FIG. 3 is a simplified high-level block diagram of the scheme of major operational steps in an exemplary implementation for creating a new key using homomorphic key-management, according to the prior art. To create a new key using HKM (Sub-Process III), appliance A creates a request to generate a new key, $k_i$ (Block Step 30), and transmits the key request to PVKM B (Arrow Step 32). PVKM B picks and stores a random number, $a_i$ (Block Step 34), and then calculates $b_{ij}=a_j/(K \ominus mask_i)$ (Block Step 36), which is then transmitted to appliance A (Arrow Step 38). Appliance A then uses the result to calculate a specific key, $S_j=b_{ij} \ominus mask_i=a_j/K$ (Block Step 40). It is noted that $S_j$ is independent of i (i.e., common to all appliances with the same master-key, K).

As mentioned, the master key is known (i.e., revealed) only to the customer. However, in "as-a-Service" use-cases, there are actually a chain of customers. For example, one customer of the key-management mechanisms may be a service provider, which may know the master key. However, "end" customers further down the chain may be customers of the service provider. A security-conscious end-customer desires to be able to use available shared or distributed resources in the aaS context configured for a multi-tenant environment, as provided by the service provider, and yet enjoy full security and control—by controlling their own keys in such a way that the service provider knows nothing about the keys.

It would be desirable to have methods and devices methods and devices for key management in an as-a-service (aaS) distributed environment. Such methods and devices would, inter alia, expand on the capabilities and applications of the methods mentioned above.

SUMMARY

It is the purpose of the present invention to provide methods and devices for key management in an as-a-service (aaS) context.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

Embodiments of the present invention enable the security-conscious customer to use available shared or distributed resources in an aaS context configured for a multi-tenant environment, and yet enjoy full security and control—with emphasis placed on key management. While three-way key-splitting in an aaS computing environment using homomorphic key-management is described below as an exemplary embodiment, it is contemplated, and within the scope of the present invention, to extend such methods to splitting keys into more than three key-shares. For example, such further key splitting could accommodate secondary (and further-distant) customers of the primary customers of a service provider.

Therefore, according to the present invention, there is provided for the first time a method for key management in an as-a-service (aaS) context, the method including the steps of: (a) upon receiving a creation request in a provider computing-environment, creating a specific key in at least one location in the provider computing-environment by repetitively computing respective specific-key contributions: (i) in a set of N computing resources in the provider computing-environment, wherein N is a non-negative integer; and (ii) in a set of M customer locations in a customer computing-environment, wherein M is a non-negative integer, and wherein the customer computing-environment is outside of the provider computing-environment; and (b) applying the respective specific-key contributions to change a specific-key value in the computing resources, wherein the respective specific-key contributions are never revealed to any computing resources, and to any customer locations, other than respective contributors associated with the respective specific-key contributions; wherein at least one location is a region of memory located in a computing resource operationally connected to the provider computing-environment, wherein the customer locations are regions of memory located in a computing resource operationally connected to the customer computing-environment, wherein the provider computing-environment is a computing environment of an aaS service provider, wherein the customer computing-environment is a computing environment of a customer of the aaS service provider, and wherein the provider computing-environment and the customer computing-environment are configured to exchange data with each other.

Alternatively, the repetitively computing includes computing at least three specific-key contributions.

Alternatively, the step of applying is performed using at least one technique selected from the group consisting of: key joining, blinding, and homomorphic encryption.

According to the present invention, there is provided for the first time a device for key management in an as-a-service (aaS) context, the device including: (a) a server including: (i) a CPU for performing computational operations; (ii) a memory module for storing data; and (iii) a network connection for communicating across a network; and (b) a protection module, residing on the server, configured for: (i) upon receiving a creation request in a provider computing-environment, creating a specific key in at least one location in the provider computing-environment by repetitively computing respective specific-key contributions: (A) in a set of N computing resources in the provider computing-environment, wherein N is a non-negative integer; and (B) in a set of M customer locations in a customer computing-environment, wherein M is a non-negative integer, and wherein the customer computing-environment is outside of the provider computing-environment; and (ii) applying the respective specific-key contributions to change a specific-key value in the computing resources, wherein the respective specific-key contributions are never revealed to any computing resources, and to any customer locations, other than respective contributors associated with the respective specific-key contributions; wherein at least one location is a region of memory located in a computing resource operationally connected to the provider computing-environment, wherein the customer locations are regions of memory located in a computing resource operationally connected to the customer computing-environment, wherein the provider computing-environment is a computing environment of an aaS service provider, wherein the customer computing-environment is a computing environment of a customer of the aaS service provider, and wherein the provider computing-environment and the customer computing-environment are configured to exchange data with each other.

Alternatively, the repetitively computing includes computing at least three specific-key contributions.

Alternatively, the applying is performed using at least one technique selected from the group consisting of: key joining, blinding, and homomorphic encryption.

According to the present invention, there is provided for the first time a non-transitory computer-readable medium, having computer-readable code embodied on the non-transitory computer-readable medium for key management in an as-a-service (aaS) context, the computer-readable code including: (a) program code for, upon receiving a creation request in a provider computing-environment, creating a specific key in at least one location in the provider computing-environment by repetitively computing respective specific-key contributions: (i) in a set of N computing resources in the provider computing-environment, wherein N is a non-negative integer; and (ii) in a set of M customer locations in a customer computing-environment, wherein M is a non-negative integer, and wherein the customer computing-environment is outside of the provider computing-environment; and (b) program code for, applying the respective specific-key contributions to change a specific-key value in the computing resources, wherein the respective specific-key contributions are never revealed to any computing resources, and to any customer locations, other than respective contributors associated with the respective specific-key contributions: wherein at least one location is a region of memory located in a computing resource operationally connected to the provider computing-environment, wherein the customer locations are regions of memory located in a computing resource operationally connected to the customer computing-environment, wherein the provider computing-environment is a computing environment of an aaS service provider, wherein the customer computing-environment is a computing environment of a customer of the aaS service provider, and wherein the provider computing-environment and the customer computing-environment are configured to exchange data with each other.

Alternatively, the repetitively computing includes computing at least three specific-key contributions.

Alternatively, the applying is performed using at least one technique selected from the group consisting of: key joining, blinding, and homomorphic encryption.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

Figure 1:
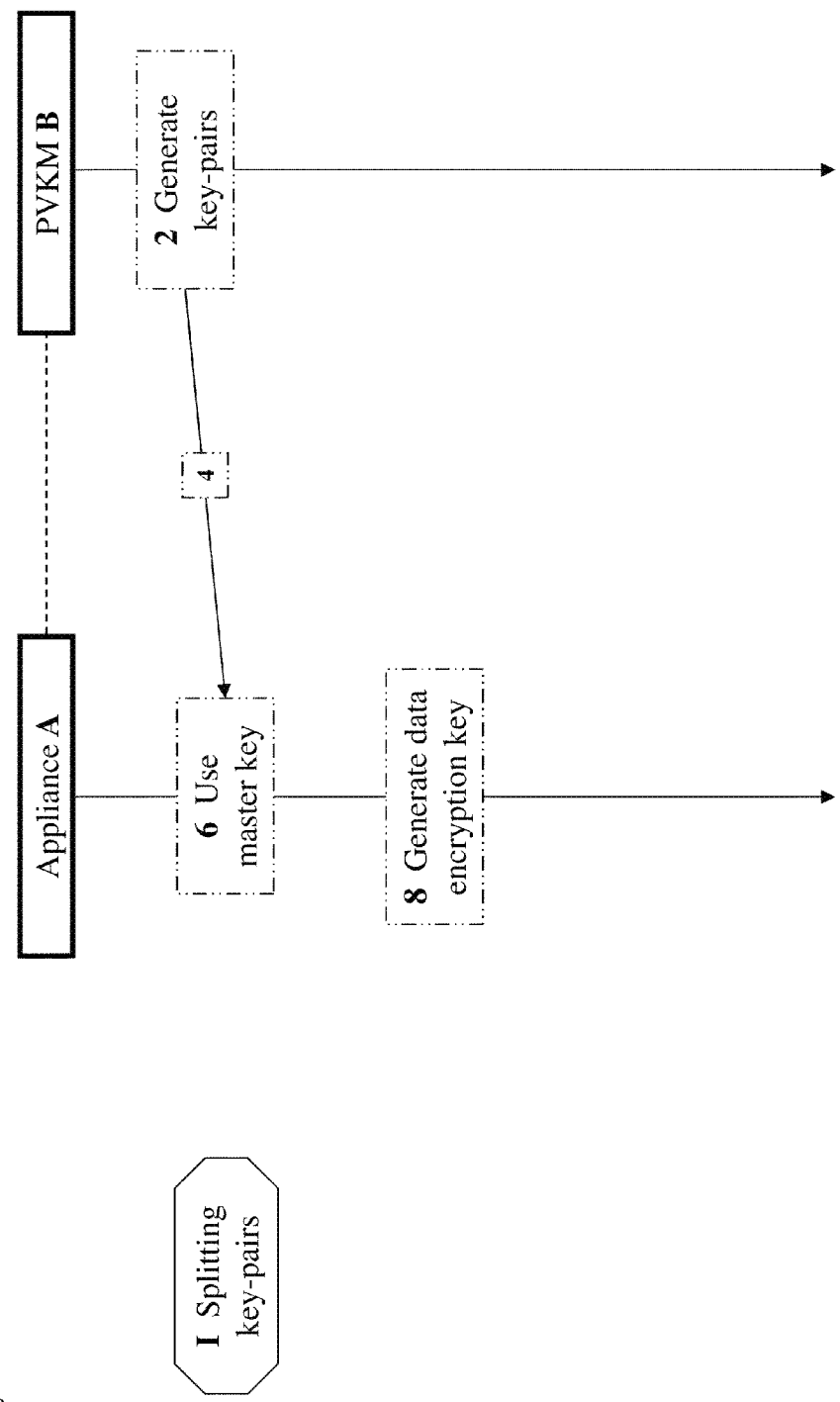
FIG. 1 is a simplified high-level block diagram of the scheme of major operational steps in an exemplary implementation for splitting keys in a key-management system, according to the prior art.

The present invention relates to methods and devices for key management in an as-a-service (aaS) context. The principles and operation for providing such methods and devices, according to the present invention, may be better understood with reference to the accompanying description and the drawings.

Consider a computing system (e.g., a software application) that includes multiple computing resources. Such resources may be defined broadly (e.g., data, secret phrases, keys, memory segments, storage areas, storage segments, networks, network segments, and computing resources). Some or all of such resources are protected by keys. It is required to use a master key (a "key-encryption key") to secure some of the keys in the system.

In computing environments involving an aaS context, several assumptions must be made related to aaS requirements.

1. Customers with sensitive data want the data to be encrypted when stored in the aaS environment;
2. Such customers want to own the encryption keys (i.e., not to have the keys stored in the aaS environment or known (i.e., revealed) to the service provider); and
3. There is no installation of any key-management software or hardware on the customer's premises: in the aaS model, the end-customer wishes to have all such complexity managed for her.

It is assumed that for such customers, it is acceptable that their data will be decrypted while being processed, but only in memory and in the customer's context (e.g., for a query or a report in a particular service application server, which is serving that customer at that moment). It is assumed that it is also acceptable that the decryption key will exist only in memory of the aaS environment for the time needed for decryption and in the customer's context (e.g. for a query or report in a particular service application server, which is serving that customer at that moment).

Considering a chain of customers, the provider of the service is a customer of the key-management system, and has a master key to ensure that no data leaks outside its control. The end-customers are the customers of the service provider, so they are customers of the customer. Such end-customers also need to have a master key, different for each of the end-customers, and unknown to anyone but themselves. The end-customers desire their own master key so that other tenants of the service, and also the service provider, are not be able to know a particular end-customer's data. Therefore, three-way splitting of keys is desired. One key-share is "owned" by the service provider, and unknown to anyone but the service provider. Another key-share is "owned" by the end-customer, and unknown to any other end-customer, or to the service provider. Yet another key-share is a "finer-granularity" key (i.e., specific to the resource intended to be protected).

It is clear that each end-customer has their own master key, and the service provider has a master key. All these master keys are protected through homomorphic encryption, thereby creating a Homomorphic Key-Management (HKM) approach which keeps all such master keys secret, even when the master keys are in use. Even when the complete computing system is running, and such master keys are in memory, an attacker looking into the memory will find all master keys encrypted at all times.

Figure 4:
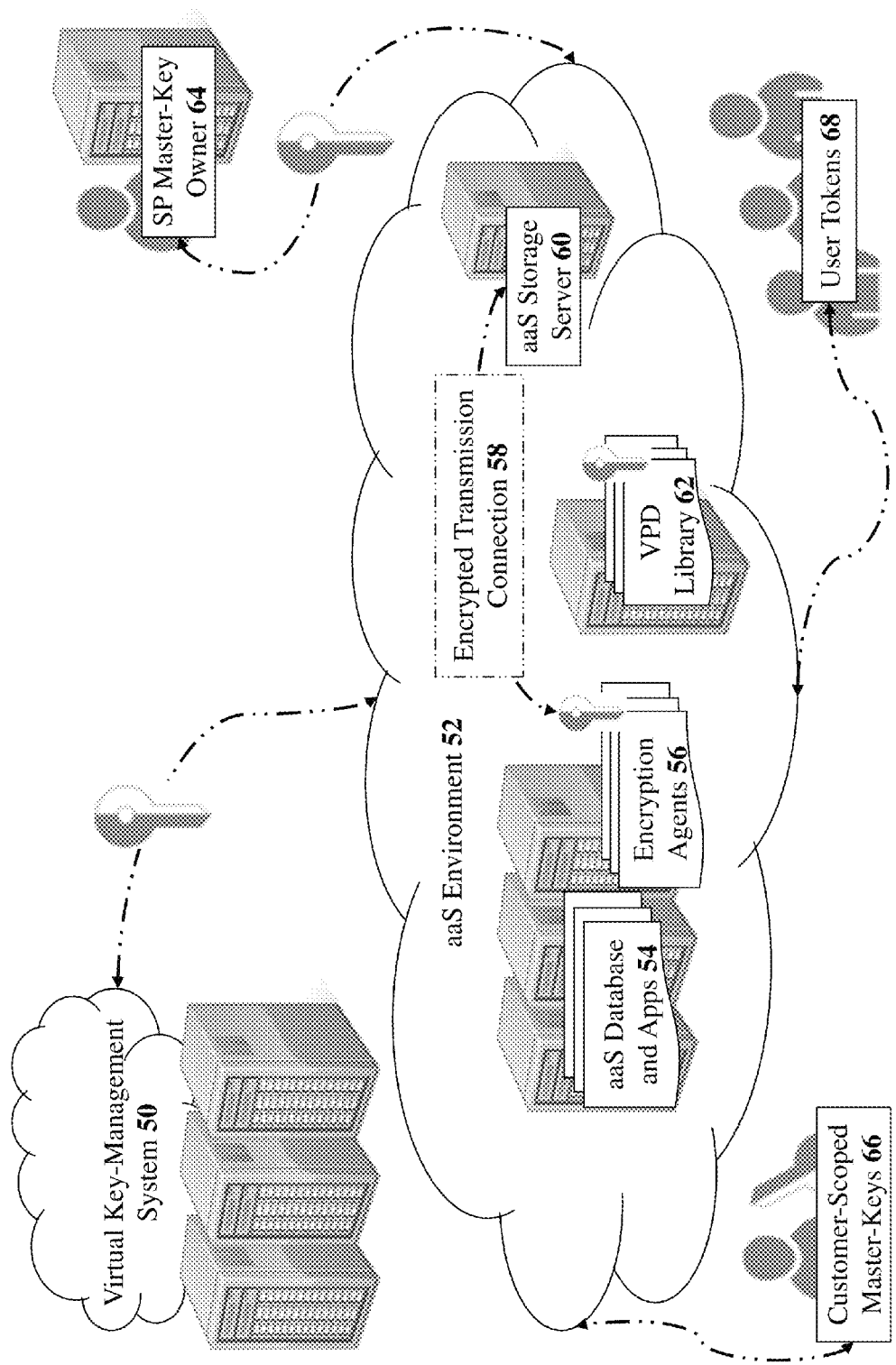
FIG. 4 is a simplified high-level block diagram of the system architecture for three-way key-splitting in an aaS computing environment using homomorphic key-management, according to embodiments of the present invention.

Referring again to the drawings, FIG. 4 is a simplified high-level block diagram of the system architecture for three-way key-splitting in an aaS computing environment using homomorphic key-management, according to embodiments of the present invention. A virtual key-management (VKM) system 50 is shown operationally connected to an aaS environment 52 having an aaS database and apps 54 with encryption agents 56. In such a configuration using encryption agents 56, HKM encrypts keys all the way down to the "app context." This means that keys can remain homomorphically encrypted even after key-shares are joined, so key-shares (i.e., key contributions) and final specific keys remain hidden. The app context can be as specific as a specific thread or process during the brief time of use for the needs of an individual tenant (i.e., customer) in the aaS system.

Encryption agents 56 can exchange encrypted data, via an encrypted transmission connection 58, with an aaS storage server 60. aaS environment 52 also includes a server or cluster of servers with a VPD (Virtual Private Data) library 62. VPD library 62 is the location where keys are split into (three) shares before storage, or joined from (three) shares before use. It is noted that such splitting and joining is performed by VPD library 62 under homomorphic encryption, so the actual key-shares and final keys are never revealed to VPD library 62.

aaS environment 52 is able to receive service provider (SP) master-keys from an SP master-key owner 64. SP master-key owner 64 may be either a human using an appropriate homomorphic-encryption tool provided by VKM system 50, or a server configured for that purpose. Customers access and utilize aaS environment 52 only after providing customer-scoped master-keys 66 which are homomorphically encrypted before being provided, while the customer's users access and utilize aaS environment 52 using user access tokens 68.

It is noted that master-key scope (e.g., a customer organization) is usually defined by the service provider in a way that is convenient for the running of aaS environment 52. In other words, scope depends upon an appropriate system definition of the idea of a customer. Such a definition is common in all aaS systems as they must define their tenants.

Scoped master-keys never leave a customer's premises, except under homomorphic encryption, meaning customer's appointed owners always control and own the customer's data. Furthermore, specific encryption keys never exist anywhere other than in the memory of a requesting thread, not even in an appliance, due to homomorphic encryption. Moreover, user tokens 68 are an access-control mechanism with an API. Projects can include mapping to aaS access control (e.g., user level, role level, organizational level, or scope level). The flexible architecture allows encryption/decryption of data to be performed by aaS environment 52 or by a system agent. VPD library 62 requires no long-term state memory, and can be placed on virtual instances as defined by aaS environment 52, meaning that the instances are completely stateless, and this approach is massively scalable.

Figure 5:
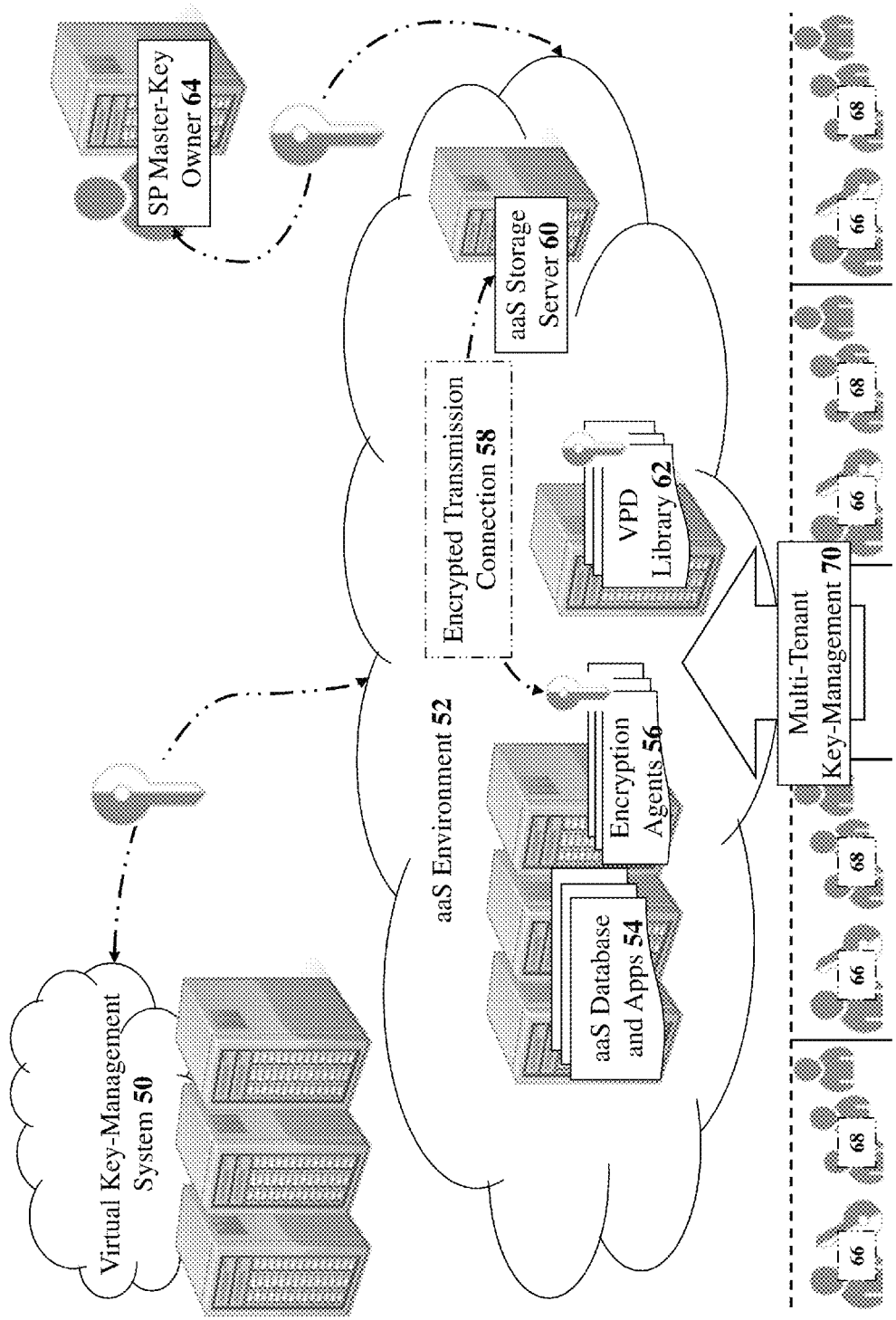
FIG. 5 is a simplified high-level block diagram of the system architecture for a multi-tenant configuration in an aaS computing environment using homomorphic key-management, according to embodiments of the present invention.

FIG. 5 is a simplified high-level block diagram of the system architecture for a multi-tenant configuration in an aaS computing environment using homomorphic key-management, according to embodiments of the present invention. FIG. 5 mainly depicts the system architecture of FIG. 4, emphasizing the multi-tenant adaptability of the architecture. In aaS scenarios in which numerous customers and their users are accessing aaS environment 52 via customer-scoped master-keys 66 and user tokens 68, respectively, operation of a multi-tenant key-management 70 is enabled.

Figure 6:
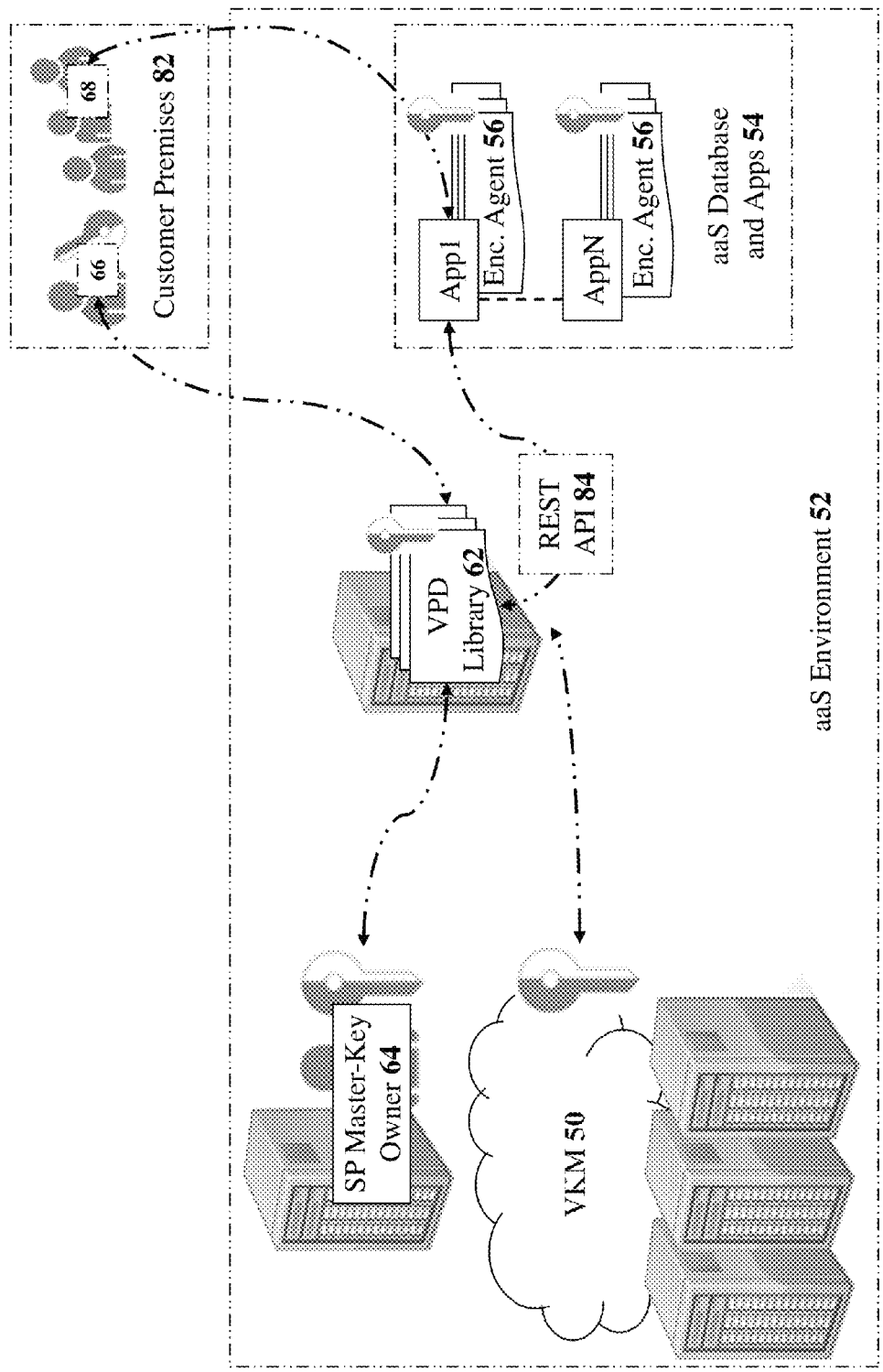
FIG. 6 is a simplified high-level block diagram of the system architecture for system deployment of a multi-tenant configuration in an aaS data center using homomorphic key-management, according to embodiments of the present invention.

FIG. 6 is a simplified high-level block diagram of the system architecture for system deployment of a multi-tenant configuration in an aaS data center using homomorphic key-management, according to embodiments of the present invention. aaS environment 52 is shown with VKM 50 (e.g., storing/generating millions of half-keys or key shares) and SP master-key owner 64 (which may be, as mentioned, a human owner with an appropriate homomorphic-encryption tool provided by VKM system 50, or an appropriately configured server, such as a tamper-resistant security module (TRSM) or hardware security module (HSM)). SP master-key owner 64 has the system master-key owned by SP CISOs (Chief Information Security Officers), for example. VKM 50 and SP master-key owner 64 are shown interfacing with VPD Library 62 on aaS cloud instances for performing operations such as key joining, key splitting, retrieving keys that are unreadable in memory, and maintaining multi-tenant operability.

Customer premises 82 include customer-scoped master-keys 66 (which are provided in homomorphically-encrypted form to VPD library 62 as needed) and user tokens 68 (which provide access to applications on aaS database and apps 54). Encryption agents 56 provide data encryption for the applications on aaS database and apps 54 and interface to VPD library 62 via a REST API 84.

Figure 7:
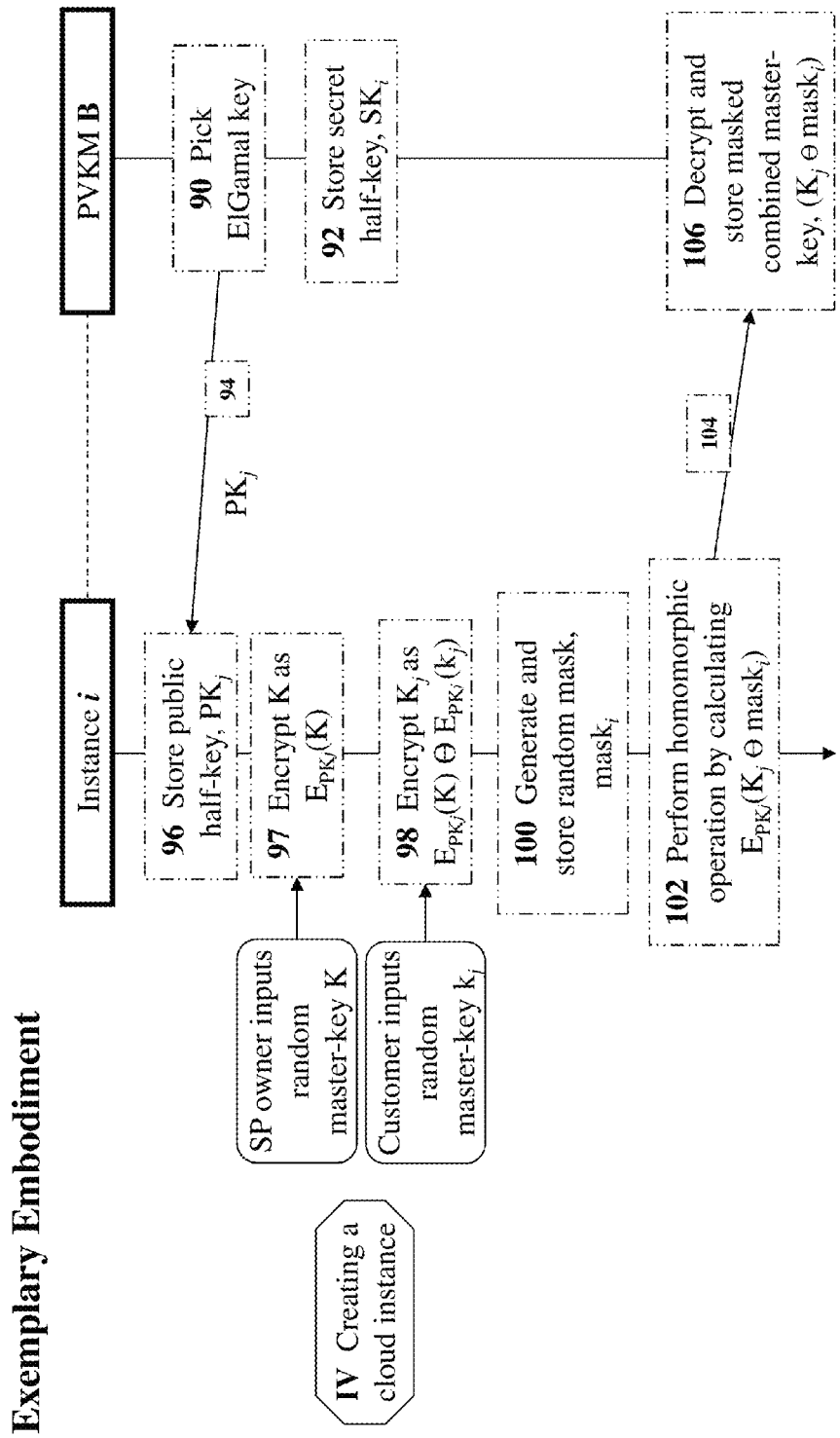
FIG. 7 is a simplified high-level block diagram of the scheme of major operational steps in an exemplary implementation for creating a cloud instance with library using homomorphic key-management, according to embodiments of the present invention.

FIG. 7 is a simplified high-level block diagram of the scheme of major operational steps in an exemplary implementation for creating a cloud instance with library using homomorphic key-management, according to embodiments of the present invention. To create a cloud instance with a library using HKM (Sub-Process IV), a service-provider cloud API is used to create a cloud instance within the aaS environment, and deploy upon the cloud instance a VPD library. Clusters of such cloud instances with the VPD library may be created using the service provider's cloud APIs. Then, PVKM B picks an ElGamal key (Block Step 90) which is different for each of the customers of the aaS environment, stores a secret half-key, $SK_j$ (Block Step 92) (wherein the index j denotes the end customer), and transmits a public PKI (public-key infrastructure) key, $PK_j$, to a cloud instance i (Arrow Step 94), which stores $PK_j$ (Block Step 96).

Instance i uses $PK_j$ to encrypt a service-provider-supplied master key K (Block Step 97), and also to encrypt a customer-supplied master-key $k_j$ as $E_{PK_j}(k_j)$. Using the homomorphic property, instance i then calculates $E_{PK_j}(K) \ominus E_{PK_j}(k_j) = E_{PK_j}(K \ominus k_j)$ (Block Step 98). Block Step 98 defines a new value, the combined master key, $K_j = K \ominus k_j$, which is encrypted homomorphically, and never revealed to anyone (neither customer, service provider, nor key management system ever know it). Instance i therefore holds a vector of combined, encrypted master-key values $K_j$ indexed by j. Instance i also generates and stores a random mask, $mask_i$ (Block Step 100). Instance i performs a homomorphic operation by calculating $E_{PK_j}(K_j \ominus mask_i)$ (Block Step 102), and transmits the result to PVKM B (Arrow Step 104), which then decrypts and stores the masked master-key, $(K_j \ominus mask_i)$ (Block Step 106).

Figure 2:
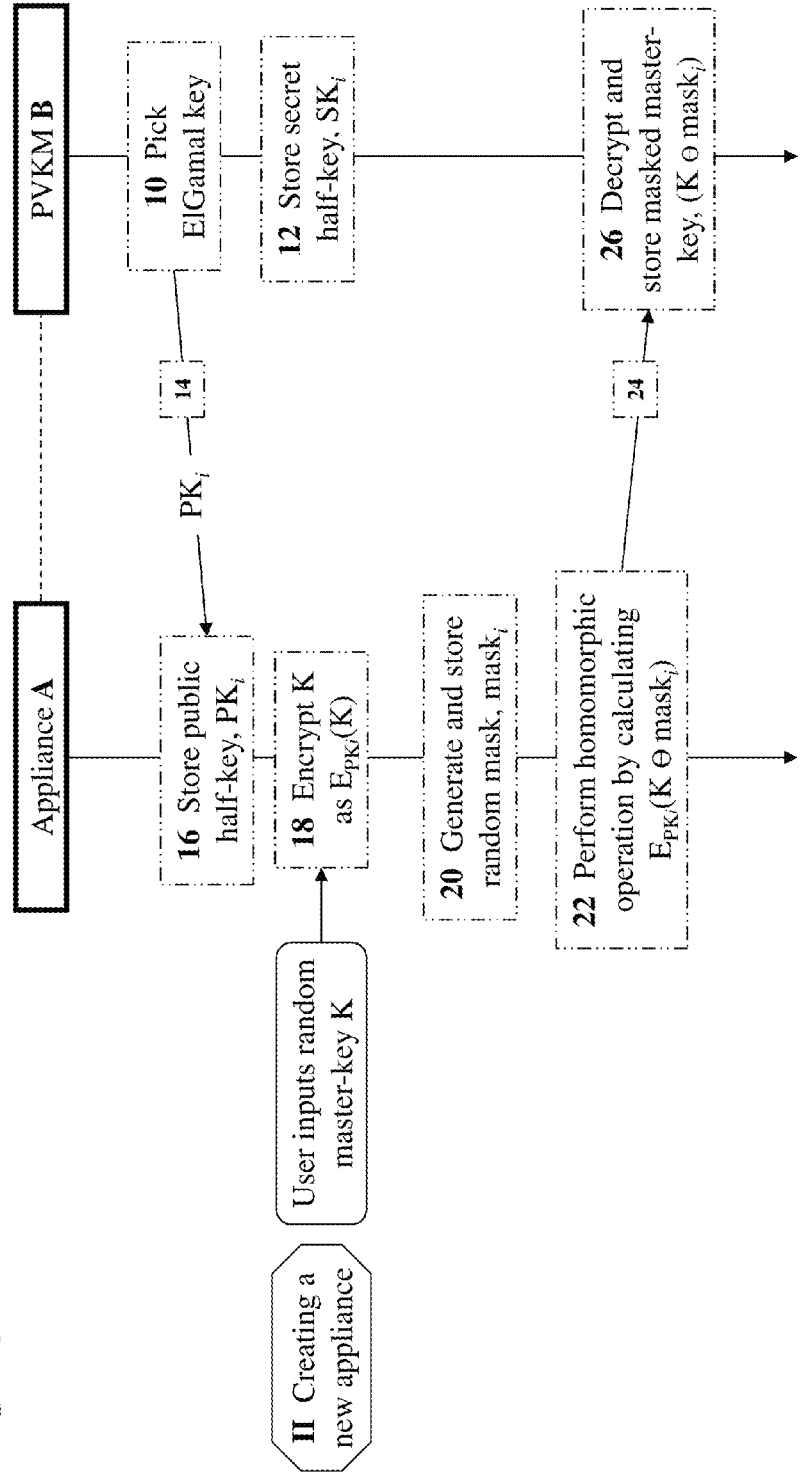
FIG. 2 is a simplified high-level block diagram of the scheme of major operational steps in an exemplary implementation for creating an appliance using homomorphic key-management, according to the prior art.
Figure 3:
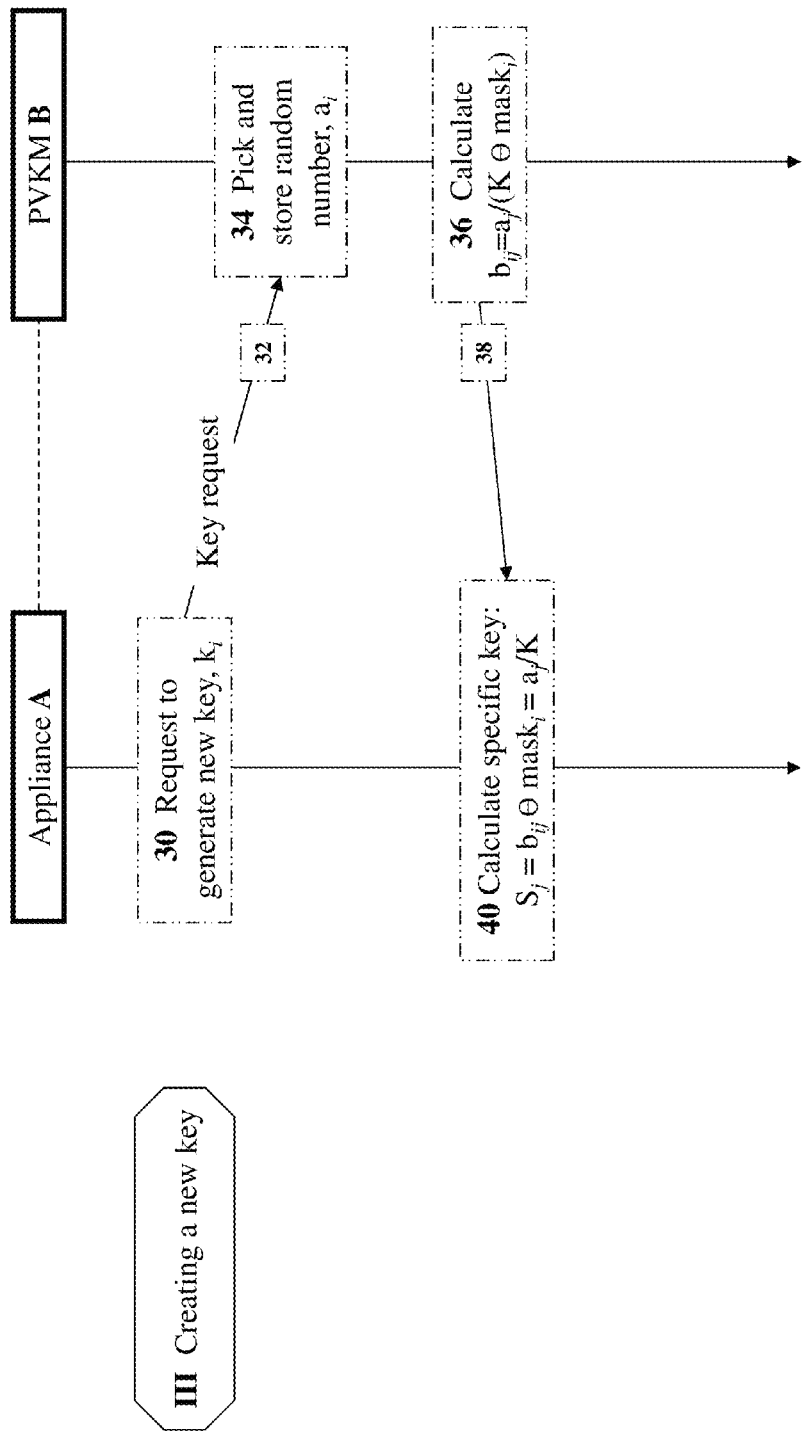
FIG. 3 is a simplified high-level block diagram of the scheme of major operational steps in an exemplary implementation for creating a new key using homomorphic key-management, according to the prior art.

It is denoted that ⊖ is a suitable operator for encryption; the inverse of ⊖ is denoted as "/" (sometimes represented by the symbol "÷") for decryption. It is further noted that instance i (as with appliance A in FIGS. 1-3) is intended to be a simplified example of a plurality of cloud instances in order to provide clarity in the description.

Figure 8:
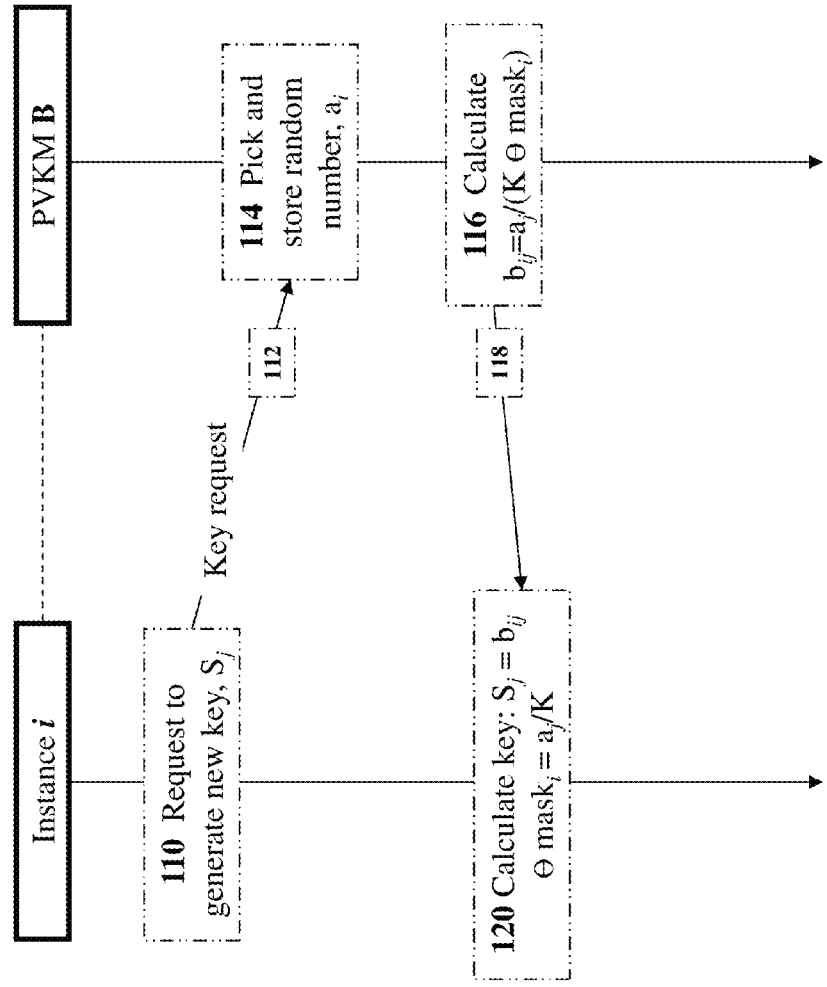
FIG. 8 is a simplified high-level block diagram of the scheme of major operational steps in an exemplary implementation for creating a new key for a cloud instance using homomorphic key-management, according to embodiments of the present invention.

FIG. 8 is a simplified high-level block diagram of the scheme of major operational steps in an exemplary implementation for creating a new key for a cloud instance using homomorphic key-management, according to embodiments of the present invention. Cloud instance i is the same as described above with regard to FIG. 7. To create a new key for a cloud instance using HKM (Sub-Process V), instance i creates a request to generate a new key, $S_j$ (Block Step 110), and transmits the key request to PVKM B (Arrow Step 112). PVKM B picks and stores a random number, $a_i$ (Block Step 114), and then calculates $b_{ij}=a_j/(K\ominus mask_i)$ with the appropriate K value (a combined master key) for that specific customer (Block Step 116), which is then transmitted to instance i (Arrow Step 118). Instance i then uses the result to calculate a cloud-instance key, $S_j=b_{ij}\ominus mask_i=a_j/K$ (Block Step 120). It is noted that $S_j$ is independent of i (i.e., common to all appliances with the same combined master-key, K).

Figure 9:
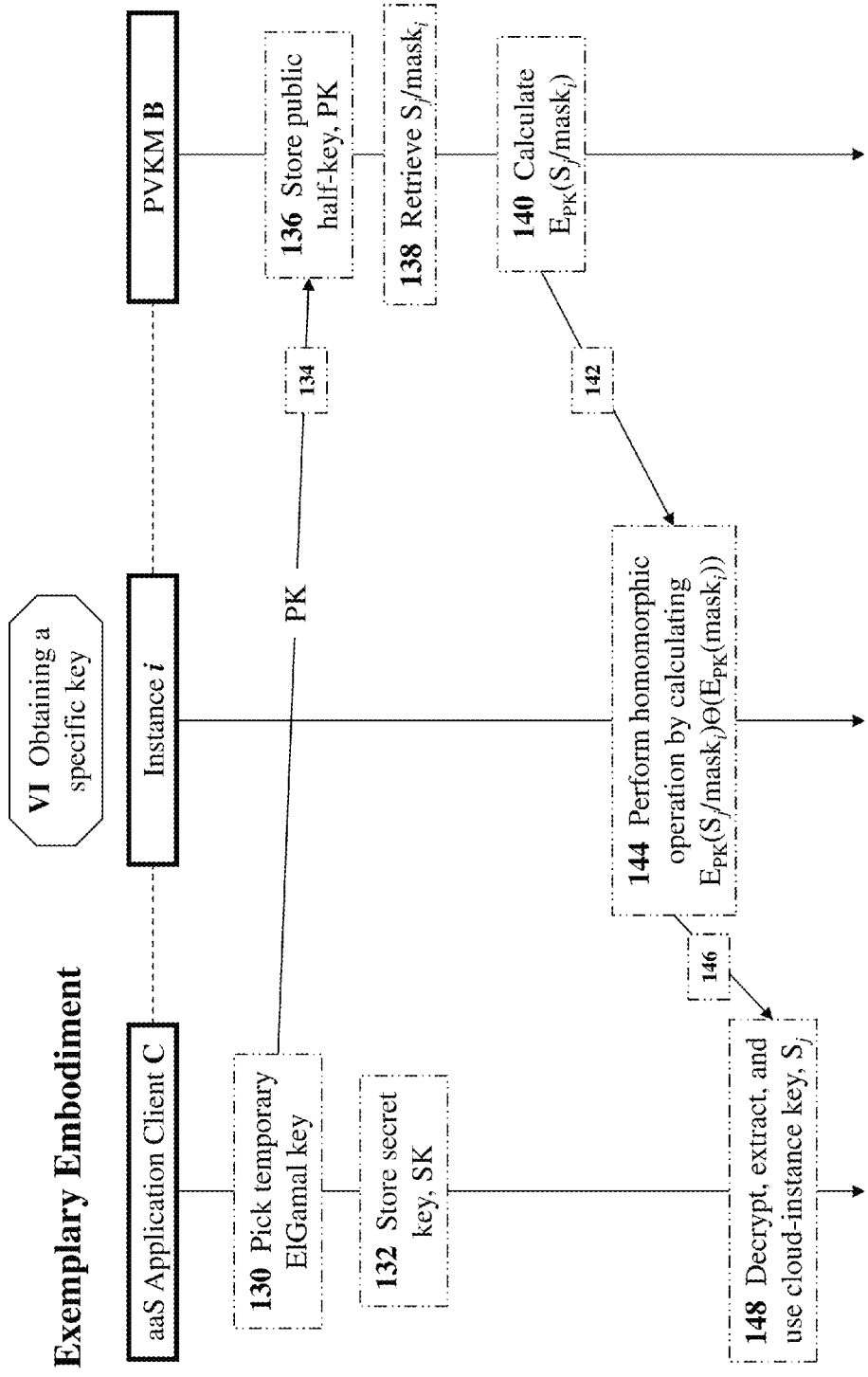
FIG. 9 is a simplified high-level block diagram of the scheme of major operational steps in an exemplary implementation for obtaining a specific key using homomorphic key-management, according to embodiments of the present invention.

FIG. 9 is a simplified high-level block diagram of the scheme of major operational steps in an exemplary implementation for obtaining a specific key using homomorphic key-management, according to embodiments of the present invention. FIG. 9 describes in detail how a specific key can be delivered to an application server without any of the PVKM or VPD library knowing (i.e., revealing) the specific key. A specific key is a key for a specific resource, such as a specific string of data that belongs to the specific customer of the specific app. It is notable and important for security that no part of the key-management system, and no part of the service provider's aaS system, ever knows such a specific key, other than the specific thread serving that specific customer at that specific moment.

To obtain a specific key (Sub-Process VI), an aaS application client C picks a temporary ElGamal key (Block Step 130), stores a secret PKI key, SK (Block Step 132), and transmits a public PKI key, PK, to PVKM B (Arrow Step 134), which stores PK (Block Step 136). PVKM B then retrieves $S_j/mask_i$ (Block Step 138), and calculates $E_{PK}(S_j/mask_i)$ (Block Step 140). PVKM B transmits the result to instance i (Arrow Step 142). Instance i performs a homomorphic operation by calculating $E_{PK}(S_j/mask_i)\ominus(E_{PK}(mask_i))=E_{PK}(S_j)$ (Block Step 144), and transmits the result to aaS application client C (Arrow Step 146). aaS application client C then decrypts (since it knows SK), extracts, and uses the cloud-instance key, $S_j$ (Block Step 148).

Figure 10:
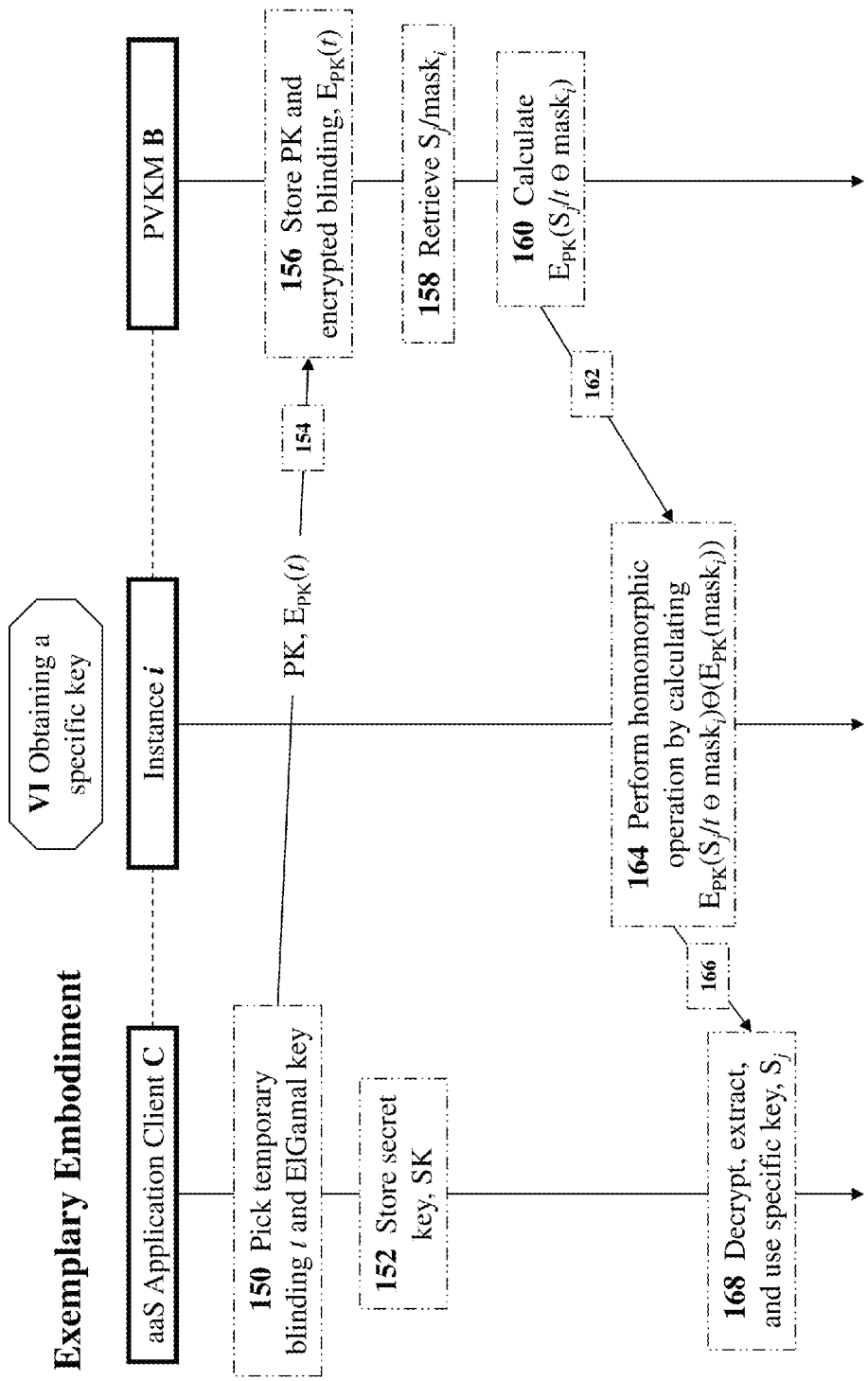
FIG. 10 is a simplified high-level block diagram of the scheme of major operational steps in an exemplary implementation for obtaining a specific key with a blinding value using homomorphic key-management, according to alternative embodiments of the present invention.

FIG. 10 is a simplified high-level block diagram of the scheme of major operational steps in an exemplary implementation for obtaining a specific key with a blinding value using homomorphic key-management, according to alternative embodiments of the present invention. To obtain a specific key with a blinding value using HKM (Sub-Process VI), an aaS application client C picks a temporary blinding value t and a temporary ElGamal key (Block Step 150), stores a secret PKI key, SK (Block Step 152), and transmits the public key, PK, and $E_{PK}(t)$ to PVKM B (Arrow Step 154), which stores PK and the encrypted blinding, $E_{PK}(t)$ (Block Step 156). PVKM B then retrieves $S_j/mask_i$ (Block Step 158), and calculates $E_{PK}(S_j/t\ominus mask_i)$ (Block Step 160). PVKM B transmits the result to instance i (Arrow Step 162). Instance i performs a homomorphic operation by calculating $E_{PK}(S_j/t\ominus mask_i)\ominus(E_{PK}(mask_i))=E_{PK}(S_j/t)$ (Block Step 164), and transmits the result to aaS application client C (Arrow Step 166). Finally, aaS application client C decrypts (since it knows SK), extracts (since it knows t), and uses the cloud-instance key, $S_j$ (Block Step 168).

While the present invention has been described with respect to a limited number of embodiments, it will be appreciated that many variations, modifications, and other applications of the present invention may be made.

What is claimed is:

1. A method for key management in an as-a-service (aaS) context, the method comprising the steps of:
   (a) upon receiving a creation request in a provider computing-environment, creating a specific key in at least one location in said provider computing-environment by repetitively computing respective specific-key contributions:
      (i) in a set of N computing resources in said provider computing-environment, wherein N is a non-negative integer, and wherein said set of N computing resources includes all computing resources in said provider computing environment; and
      (ii) in a set of M customer locations in a customer computing-environment, wherein M is a non-negative integer, wherein said set of M customer locations includes all customer locations in said customer computing environment, and wherein said customer computing-environment is outside of said provider computing-environment; and
   (b) applying said respective specific-key contributions to change a specific-key value in said computing resources, wherein said respective specific-key contributions are never revealed in unencrypted form to any of said computing resources, and to any of said customer locations, other than respective creation-request contributors associated with said respective specific-key contributions during request initiation;
   wherein said at least one location is a region of memory located in a given computing resource of said set of N computing resources, operationally connected to said provider computing-environment, wherein said customer locations are regions of memory located in a given computing resource of said set of M customer locations, operationally connected to said customer computing-environment, wherein said provider computing-environment is a computing environment of an aaS service provider, wherein said customer computing-environment is a computing environment of a customer of said aaS service provider, and wherein said provider computing-environment and said customer computing-environment are configured to exchange data with each other.

2. The method of claim 1, wherein said repetitively computing includes computing at least three said specific-key contributions.

3. The method of claim 1, wherein said step of applying is performed using at least one technique selected from the group consisting of: key joining, blinding encryption, partially-homomorphic encryption, and fully-homomorphic encryption.

4. A device for key management in an as-a-service (aaS) context, the device comprising:
   (a) a server including:
      (i) a CPU for performing computational operations;
      (ii) a memory module for storing data; and
      (iii) a network connection for communicating across a network; and
   (b) a protection module, residing on said server, configured for:

(i) upon receiving a creation request in a provider computing-environment, creating a specific key in at least one location in said provider computing-environment by repetitively computing respective specific-key contributions:

(A) in a set of N computing resources in said provider computing-environment, wherein N is a non-negative integer, and wherein said set of N computing resources includes all computing resources in said provider computing environment; and (B) in a set of M customer locations in a customer computing-environment, wherein M is a non-negative integer, wherein said set of M customer locations includes all customer locations in said customer computing environment, and wherein said customer computing-environment is outside of said provider computing-environment; and (ii) applying said respective specific-key contributions to change a specific-key value in said computing resources, wherein said respective specific-key contributions are never revealed in unencrypted form to any of said computing resources, and to any said customer locations, other than respective creation-request contributors associated with said respective specific-key contributions during request initiation;

wherein said at least one location is a region of memory located in a given computing resource of said set of N computing resources, operationally connected to said provider computing-environment, wherein said customer locations are regions of memory located in a given computing resource of said set of M customer locations, operationally connected to said customer computing-environment, wherein said provider computing-environment is a computing environment of an aaS service provider, wherein said customer computing-environment is a computing environment of a customer of said aaS service provider, and wherein said provider computing-environment and said customer computing-environment are configured to exchange data with each other.

5. The device of claim 4, wherein said repetitively computing includes computing at least three said specific-key contributions.

6. The device of claim 4, wherein said applying is performed using at least one technique selected from the group consisting of: key joining, blinding encryption, partially-homomorphic encryption, and fully-homomorphic encryption.

7. A non-transitory computer-readable medium, having computer-readable code embodied on the non-transitory computer-readable medium for key management in an as-a-service (aaS) context, the computer-readable code comprising:

(a) program code for, upon receiving a creation request in a provider computing-environment, creating a specific key in at least one location in said provider computing-environment by repetitively computing respective specific-key contributions:

(i) in a set of N computing resources in said provider computing-environment, wherein N is a non-negative integer, and wherein said set of N computing resources includes all computing resources in said provider computing environment; and (ii) in a set of M customer locations in a customer computing-environment, wherein M is a non-negative integer, wherein said set of M customer locations includes all customer locations in said customer computing environment, and wherein said customer computing-environment is outside of said provider computing-environment; and (b) program code for, applying said respective specific-key contributions to change a specific-key value in said computing resources, wherein said respective specific-key contributions are never revealed in unencrypted form to any of said computing resources, and to any said customer locations, other than respective creation-request contributors associated with said respective specific-key contributions during request initiation;

wherein said at least one location is a region of memory located in a given computing resource of said set of N computing resources, operationally connected to said provider computing-environment, wherein said customer locations are regions of memory located in a given computing resource of said set of M customer locations, operationally connected to said customer computing-environment, wherein said provider computing-environment is a computing environment of an aaS service provider, wherein said customer computing-environment is a computing environment of a customer of said aaS service provider, and wherein said provider computing-environment and said customer computing-environment are configured to exchange data with each other.

8. The non-transitory computer-readable medium of claim 7, wherein repetitively computing includes computing at least three said specific-key contributions.

9. The non-transitory computer-readable medium of claim 7, wherein said applying is performed using at least one technique selected from the group consisting of: key joining, blinding encryption, partially-homomorphic encryption, and fully-homomorphic encryption.

* * * * *